United States Patent [19]

Dlugos et al.

[11] 4,410,961

[45] Oct. 18, 1983

[54] INTERFACE BETWEEN A PROCESSOR SYSTEM AND PERIPHERAL DEVICES USED IN A MAILING SYSTEM

[75] Inventors: Daniel F. Dlugos, Huntington; Flavio M. Manduley, Woodbury; Arthur Rubinstein, Norwalk, all of Conn.

[73] Assignee: Pitney Bowes Inc., Stamford, Conn.

[21] Appl. No.: 235,241

[22] Filed: Feb. 17, 1981

[51] Int. Cl.³ .............................................. G06F 15/20
[52] U.S. Cl. ..................................... 364/900; 364/466
[58] Field of Search ... 364/200 MS File, 900 MS File, 364/464, 466; 177/25

[56] References Cited

U.S. PATENT DOCUMENTS 4,127,896 11/1978 Raslavsky .......................... 364/200
4,339,807 7/1982 Uchimura et al. .................. 364/900

*Primary Examiner*—Raulfe B. Zache
*Attorney, Agent, or Firm*—Robert H. Whisker; David E. Pitchenik; William D. Soltow, Jr.

[57] ABSTRACT

A peripheral interface board establishes a communications link between a postage value determining system processor associated with a postage scale and a plurality of peripheral devices. The interface includes a microcomputer which receives data and command signals from the system processor. A multiplexer interconnects the peripheral transmit line of the microcomputer with a selected peripheral device, while a further multiplexer interconnects the peripheral receive line of the microcomputer with the selected peripheral device. Typical mailing system peripheral devices include electronic postage meters, an electronic accounting system, a scale computer interface and a printer. In response to command signals from the system processor, the microcomputer establishes a communications link with a selected peripheral device. Communications subroutines include signal transmission and/or receipt, temporary storage of data received for communication to or from a peripheral device and communication with the system processor.

8 Claims, 5 Drawing Figures

INTERFACE BETWEEN A PROCESSOR SYSTEM AND PERIPHERAL DEVICES USED IN A MAILING SYSTEM

BACKGROUND OF THE INVENTION

1. Field of the Invention

This invention relates generally to postage scales adapted to weigh an article and determine the appropriate postage to be applied thereto. More particularly, the present invention is directed to an interface which enables a postage scale processor to communicate with a plurality of peripheral devices associated with a mailing system.

2. Related Applications

The present invention includes an interface board which interconnects a postage value determining system processor with a plurality of peripheral devices associated with a mailing system. In a copending application of Daniel F. Dlugos entitled Multiprocessor Parcel Postage Metering System Having Serial Data Bus, Ser. No. 13,734, filed Feb. 21st, 1979 and assigned to the assignee of the preesent invention, now issued as U.S. Pat. No. 4,308,579 a postage calculating system having a serial communications controller for communications between the system processor and peripheral devices was disclosed. The system included a serial communications but through which the peripheral devices communicated with the system processor. Some peripherals were interconnected to the serial communications bus by a separate peripheral controller, while a meter setting device was directly linked to the serial communications bus. Appropriate signals were transmitted along an attention line when it was desired to select a peripheral which would receive or transmit via the shared communications bus. Acknowledgement lines were also provided to acknowledge receipt of signals. The serial communications controller comprised an integral part of the main postage calculator system circuit board.

Since the serial controller was an integral part of the main scale system circuit board, a purchaser who only wished to acquire a postage scale and not the peripheral devices or not all of the available peripherals was at a disadvantage. In addition, if a malfunction arose, the serial communications controller and the communications bus were not serviceable as a single unit on a separate board.

The sharing of a common communications bus by all peripheral devices made the replacement or substitution of different peripheral devices a formidable task which required reprogramming.

A serial communications system between a postage meter control unit and a plurality of external devices has been disclosed in copending application of John H. Soderberg et al entitled Electronic Postage Meter Having Plural Computing Systems, Ser. No. 89,413, filed Oct. 30, 1979, and assigned to the assignee of the present invention now issued as U.S. Pat. No. 4,301,507. The communications protocol procedure disclosed in such application related to the serial transmission of data and bit by bit return of such data to the transmitter verification. This copending application disclosed a system comprising a daisy chain between a plurality of external devices and a control unit. It should be appreciated that a communications buffer comprised of a daisy chain prolonged the time required for the transmission of data especially when one considers the bit by bit return for verification of transmitted data. Further, the possibility that a device along the daisy chain might introduce error was present.

SUMMARY OF THE INVENTION

An interface associated with a postage scale system processor is adapted to interconnect the system processor with a plurality of mailing system peripheral devices. The interface includes a peripheral microcomputer, the transmit and receive lines of which are multiplexed among selected peripherals.

To transmit data to a selected peripheral, the system processor provides a command write signal to the microcomputer and subsequently loads data into a transmit buffer of the microcomputer. The accuracy of the transmission is verified and thereafter the system processor provides a transmit command which designates the appropriate channel for the selected peripheral. The microcomputer proceeds with establishing a communications links with the selected peripheral and transmits the data stored in the transmit buffer to the peripheral employing an appropriate communication subroutine.

If a transmit and receive command was provided by the system processor, the microcomputer thereafter awaits transmission of data from the peripheral through the communications routine and stores such data in a receive buffer. Upon receipt of a read command, the data stored in the receive buffer is loaded into the system processor.

When a set dollar value amount is transmitted to an electronic postage meter, a request for the value set is then transmitted to the meter. The microcomputer awaits receipt of a signal indicating the amount which has been set by the meter; this value is then transmitted to the system processor for comparison with the set value originally transmitted. Upon a trip command, the microcomputer transmits a trip signal to a mailing machine for tripping the meter and awaits receipt of a meter trip complete signal from the postage meter.

A plurality of communications subroutines are stored in the microcomputer program memory. Thus, versatility in the selection of peripheral devices which may be employed in conjunction with a stand alone postage scale is available. A system output line is provided for communication with peripheral devices employing the RS 232 communications hardware standard such as a printer.

From the above compendium, it will be appreciated that it is object of the present invention to provide a communications interface of the general character described between a postage value determining system processor and peripheral devices associated with a mailing system which is not subject to the disadvantages of the prior art.

A further object of the present invention is to provide an interface of the general character described between a postage value determining system processor and a plurality of mailing system peripheral devices associated with a mailing system which communicates with various peripheral devices having differing communications subroutines.

Another object of the present invention is to provide an interface of the general character described between a postage value determining system processor and a plurality of peripheral devices associated with a mailing system which relieves the system processor of the communications routines.

A still further object of the present invention is to provide a stand alone postage scale having a system processor for determining postage values of articles to be mailed which is relatively low in cost and an interface of the general character described for establishing communications links between the scale system processor and a plurality of optional mailing system peripheral devices.

Yet a further object of the present invention is to provide an automated mailing system of the general character described including a postage scale having a system processor and an interface connecting the system processor with a plurality of peripheral devices wherein the servicing of malfunctions attributable to the interface is simplified.

Other objects of the present invention in part will be obvious and in part will be pointed out hereinafter.

With these ends in view, the invention finds embodiment in certain combinations of elements, arrangements of parts and series of steps by which the objects aforementioned and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
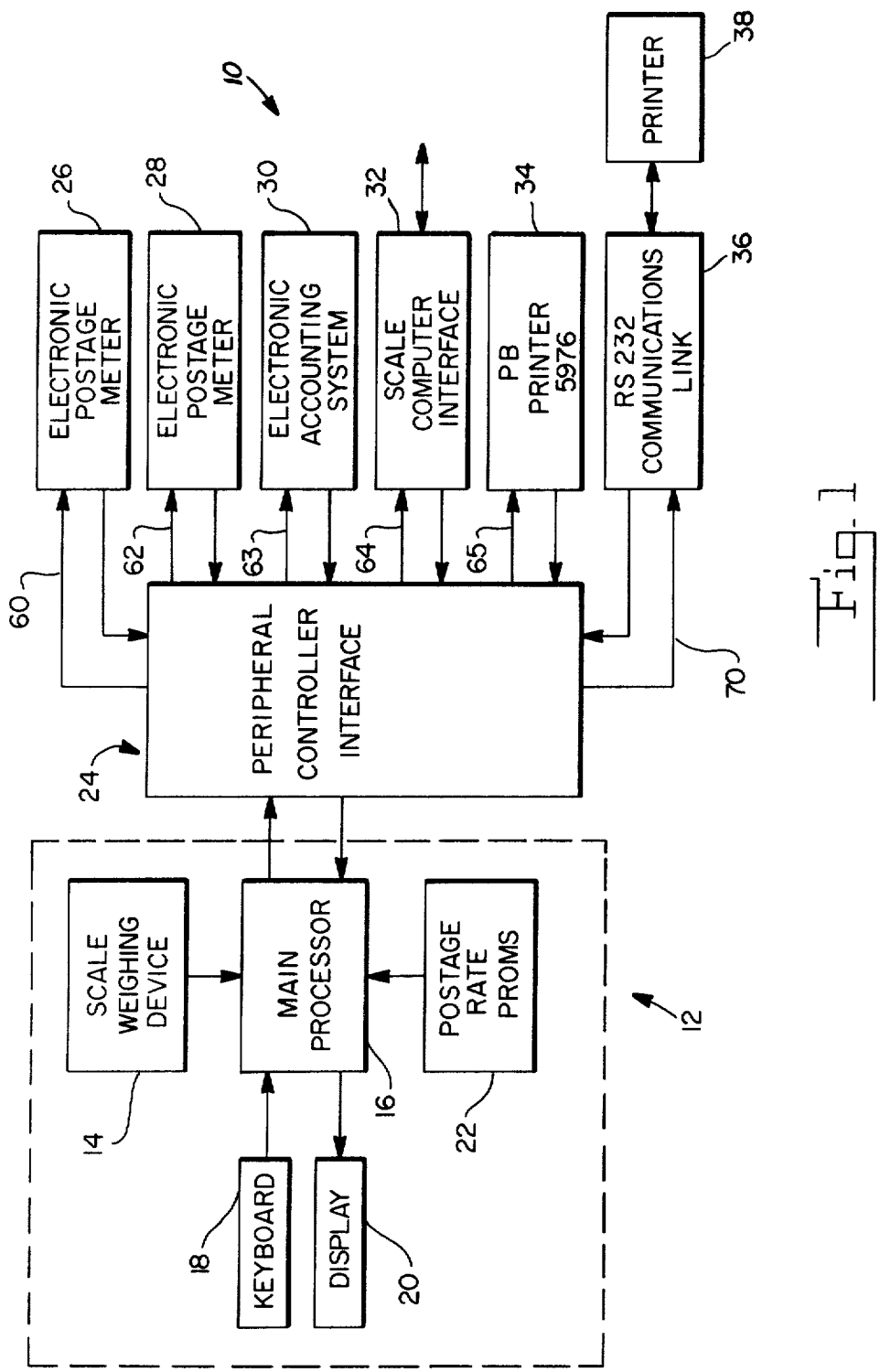
FIG. 1 is a schematized block diagram of a typical mailing system and schematically illustrates a peripheral controller interface constructed in accordance with and embodying the present invention interconnecting a postage value determining system processor associated with a postage scale and a plurality of mailing system peripheral devices.

Referring now in detail to the drawings, the reference numeral 10 denotes generally an automated mailing system including a processor controlled stand alone postage scale 12. The scale 12 is adapted to calculate the postage or other transportation charges required to transport an article. In most instances, transportation charges are based upon the article weight, class of transportaiton and, with respect to certain classes, distance to destination (zone). The scale 12 includes a weighing device 14 having a tray or platform adapted to receive the article to be mailed. The weighing device 14 is interconnected to a main system processor 16. The system processor 16 is programmed to compute the requisite postage or other transportation charges for an article placed upon the platform.

The data necessary for the determination of article postage, e.g. destination operands, class of transportation operands, etc., are entered at a keyboard 18 and corresponding signals are transmitted to the system processor 16. Keyboard and calculated information are indicated at a display 20.

With the weight, class of transportation and destination zone operands entered, the system processor 16 determines the requisite postage by reference to a postage rate PROM 22 and provides a signal to the display 20 for indicating the calculated postage amount. A suitable microprocessor for implementation as the system processor 16 is an Intel 8085 processor available from Intel Corporation of Santa Clara, Calif. The foregoing mode of operation of the scale 12 is well known to those of skill in the art and typically illustrated in U.S. Pat. No. 4,135,662 entitled Operator Prompting System issued Jan. 23, 1979 to Daniel F. Dlugos and assigned to the assignee of the present invention.

The postage value determining system processor disclosed in U.S. Pat. No. 4,135,662, supra, was integral with a complete mailing system and transmitted a postage value signal to a meter setting device for setting a postage meter and dispensing the calculated postage.

Pursuant to the present invention, the scale 12 is constructed as a stand alone unit for use without peripheral devices associated with a complete mailing system yet maintains versatility for controlling, transmitting data to and receiving data from various peripheral devices if a complete mailing system is desired by the user. As such, the scale 12 is available at an economical cost because its circuit does not incorporate an interface for communication with mailing system peripheral devices.

A peripheral controller interface 24 is provided as a separate, self-contained board and is adapted to establish communications links between the system processor 16 and various mailing system peripheral devices such as one or more electronic postage meters 26, 28. The meter 26 is adapted to dispense U.S. Postal Service postage denominations, while the meter 28 is adapted to print private carrier transportation charges, e.g. United Parcel Service.

Electronic postage meters of this general type are described in U.S. Pat. No. 3,978,457 entitled Microcomputerized Electronic Postage Meter System issued Aug. 31st, 1976 to Frank P. Check, Jr. et al and assigned to the assignee of the present invention. Additional electronic postage meters of this type include the electronic postage meter disclosed in U.S. Pat. No. 4,301,507 previously referred to.

The electronic postage meters 26, 28 are programmed for communication with the system processor 16 pursuant to the communications routine disclosed in the co-pending application Ser. No. 89,413. Such communications routine is serial character asynchronous, bit synchronous, in message form, with the bits of the message being timed in accordance with a given schedule. The messages are returned or echoed by the recipient, bit by bit for checking. This communications routine has been designated "Echoplex".

A further mailing peripheral device which is programmed for communication with the main system processor 16 through the peripheral controller interface 24 and employing the Echoplex communications routine and protocol is an electronic accounting system 30.

Additionally, a computer interface 32 and a Pitney Bowes Model 5976 printer 34 may be employed, both of which communicate through the Echoplex routine.

A further communications link 36 is provided for communications through an RS 232 hardware standard. The RS 232 communications link 36 could interface with one of several available RS 232 printers 38 or any other desirable peripheral device which communicates in ASCII code, for example.

Figure 2:
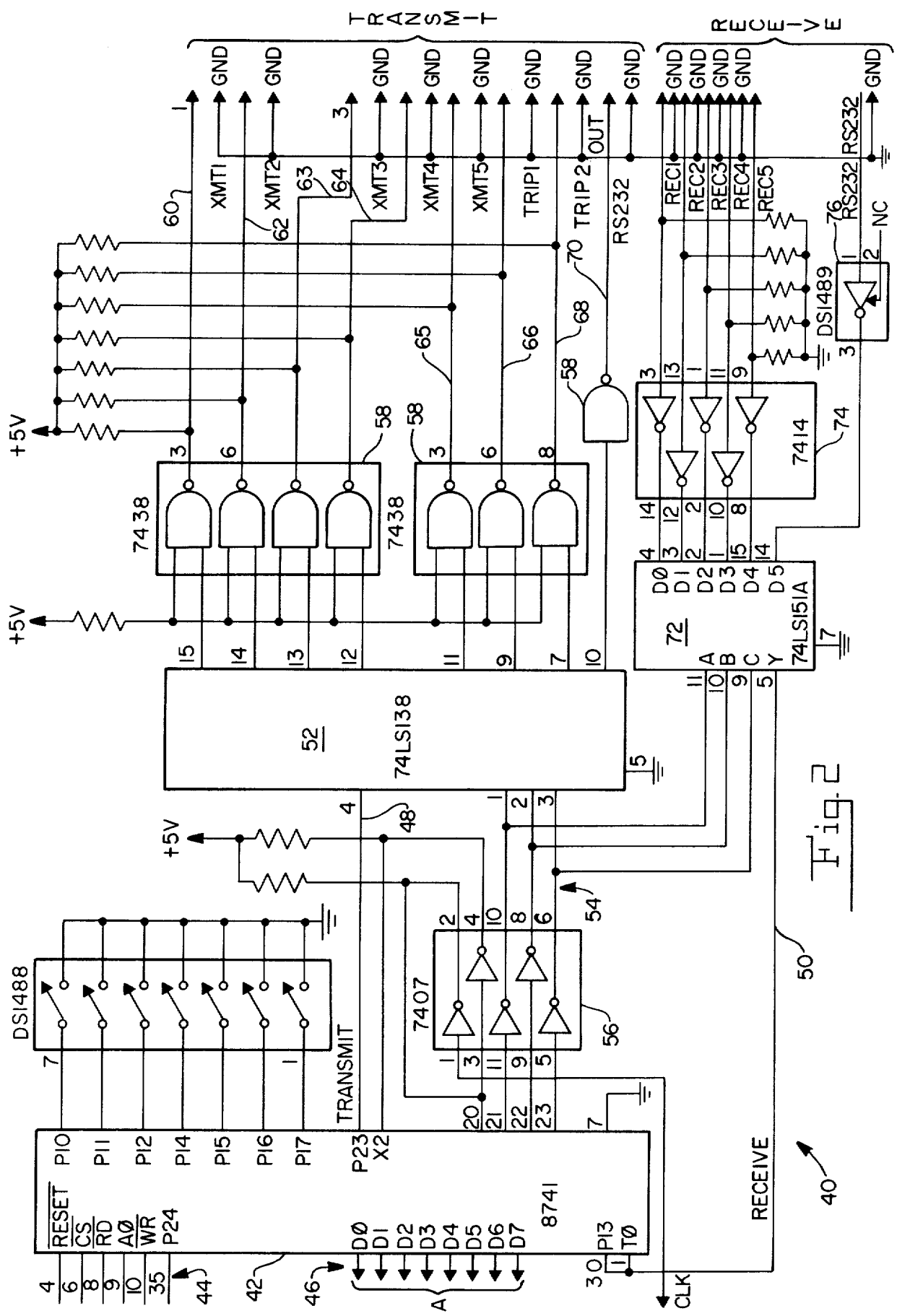
FIG. 2 is a schematic illustration of the peripheral controller interface circuit.

In FIG. 2, a schematized block diagram of a peripheral controller interface board 40 is illustrated. The interface includes a peripheral eight bit controller 42 which may comprise an Intel type 8741 or 8041 microcomputer. The controller 42 receives command signals from the system processor 16 through a plurality of input lines denoted generally by the reference numeral 44. Data communication between the system processor and the controller 42 is carried over a plurality of data lines 46 which extend to a data bus (D0–D7). The controller 42 includes a CPU section, a program memory and temporary buffers for commands and data flowing between the CPU section and the system processor 16.

Communication between the controller 42 and the selected peripheral devices extends serially along a transmit line 48 and a receive line 50. The transmit line 48 extends to a multiplexer 52. The multiplexer 52 will output the signal on the transmit line 48 to one of eight output lines depending upon the signal states or three binary select input terminals. Three select lines denoted generally by the reference numeral 54 extend from suitable terminals of the controller 42 through a buffer 56 to the select input terminals of the multiplexer 52.

Seven output lines of the multiplexer 52 extend through a buffer 58 comprising a NAND gate for each line.

From the NAND gate, a transmit line 60 extends to the electronic postage meter 26, while a further transmit line 62 interconnects with the electronic postage meter 28. A transmit line 63 extends to the electronic accounting system 30 and a transmit line 64 is provided for transmission of signals to the scale computer interface 32. A further transmit line 65 is provided for communication to the printer 34.

A trip transmit line 66 is provided for actuating a mailing machine associated with the postage meter 26 to cause the meter 26 to imprint a postage value and a similar transmit line 68 extends to a mailing machine associated with the postage meter 28.

In addition, a transmit line 70 is provided for communication to an RS 232 interface 36 for actuation of a suitable device such as the printer 38. In most instances, either the Pitney Bowes printer 34 which communicates in an Echoplex protocol or an RS 232 printer 38 will be employed.

Each transmit line 60 through 68 is connected with a positive voltage supply through a series resistance to maintain appropriate voltage levels.

When the controller 42 provides appropriate line select signals through the select lines 54, such signal is simultaneously applied to both the transmit multiplexer 52 and a data selector multiplexer 72 which interconnects a selected one of six possible receive lines extending from the peripheral devices.

Communication between the controller 42 and each mailing machine for trip is only a transmit basis and therefore there are no receive lines from the mailing machine to correspond to the transmit lines 66, 68.

Each of the receive lines extending between a signal transmitting peripheral device and the data selector multiplexer 72 includes suitable buffers which comprise a resistance to ground and an inverter 74. The receive line extending from the RS 232 interface 36 and the multiplexer 72 includes a suitable buffer 76.

It should be additionally noted that a switch bank 78 is interconnected to the PORT 1 I/O lines of the controller 42. The switch bank is read by the controller 42 in response to a command from the system processor 16 to determine a peripheral device in the system. For example, a switch may indicate a specific RS 232 printer 38 for formatting data to be loaded into the transmit buffer by the system processor 16.

The controller 42 is programmed to handle the communications between the system processor 16 and any peripheral devices selected to be employed in the mailing system. As previously mentioned, data for transmission to a selected peripheral device is loaded into a buffer of the controller and then transmitted to the peripheral device upon receipt of appropriate command signals. If data is to be received from a peripheral device, such information is stored in a further buffer of the controller 42 and loaded into the system processor upon receipt of an appropriate command signal.

The controller 42 is programmed with the appropriate subroutines necessary for communication with Echoplex peripheral devices, as well as RS 232 devices, and relieves the system processor of such functions. The system processor 16 merely loads data to be transmitted into the buffer of the controller 42 and is free to assume other functions in conjunction with monitoring the weighing platform, reading the keyboard, etc.

Figure 3:
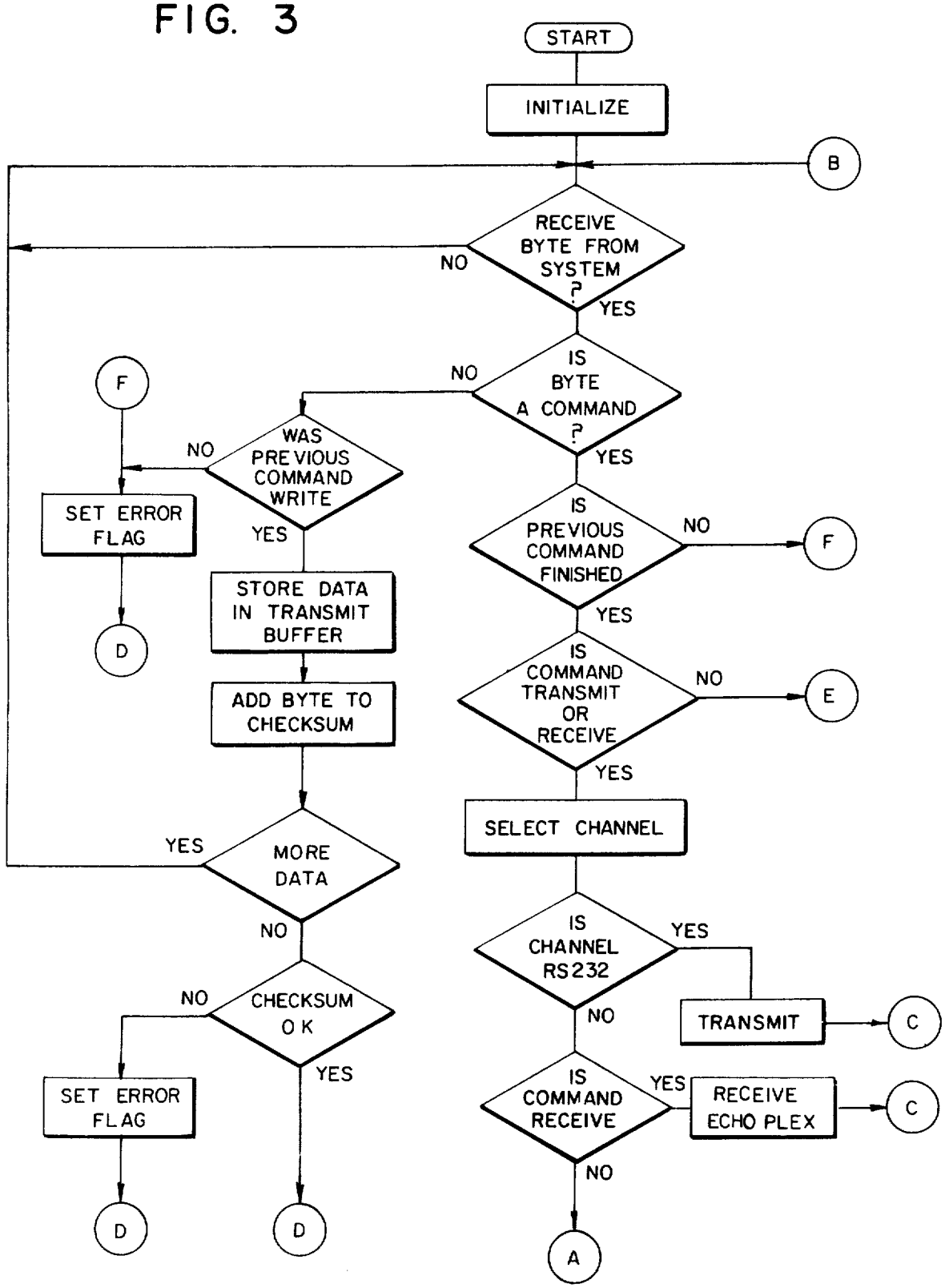
FIG. 3 is a flow chart illustrating a portion of the basic routine for interface operation.
Figure 4:
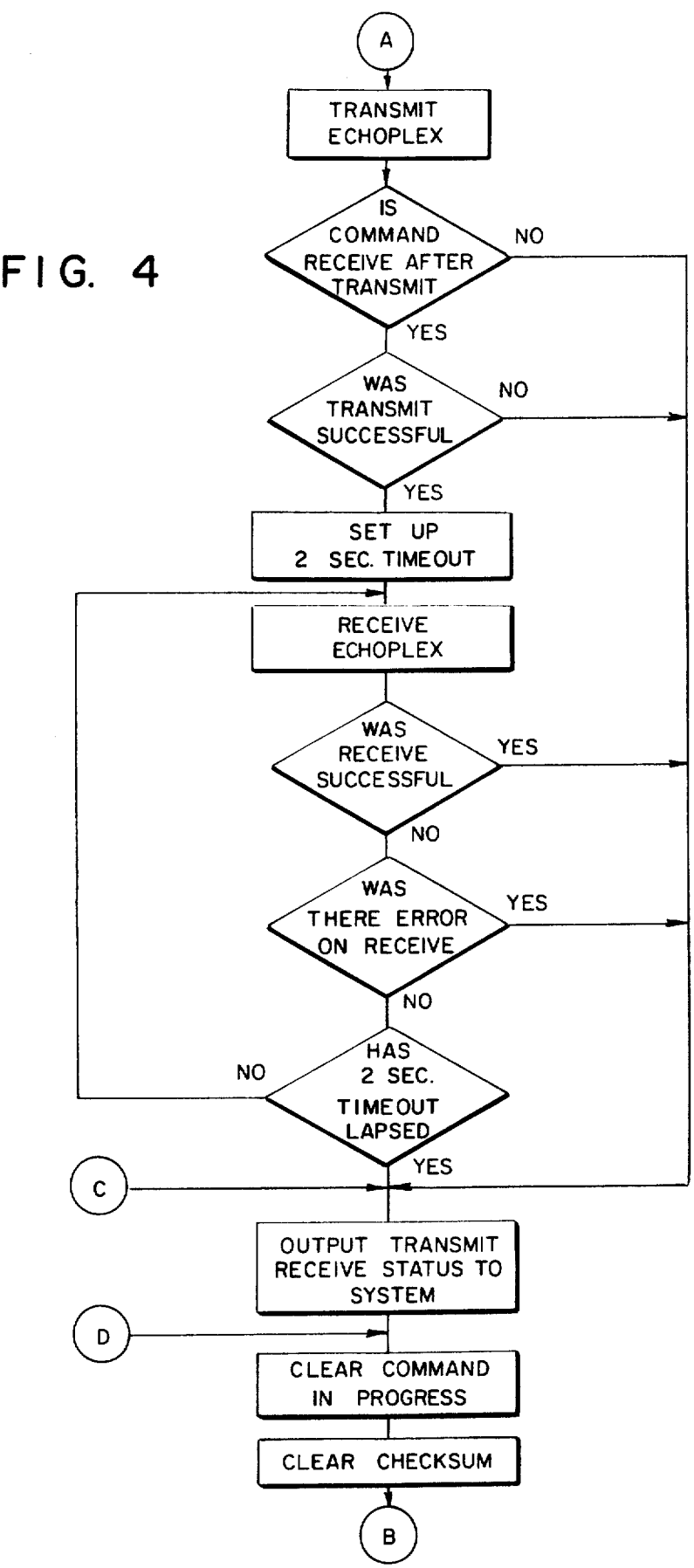
FIG. 4 is a flow chart illustrating a further portion of the routine for interface operation.
Figure 5:
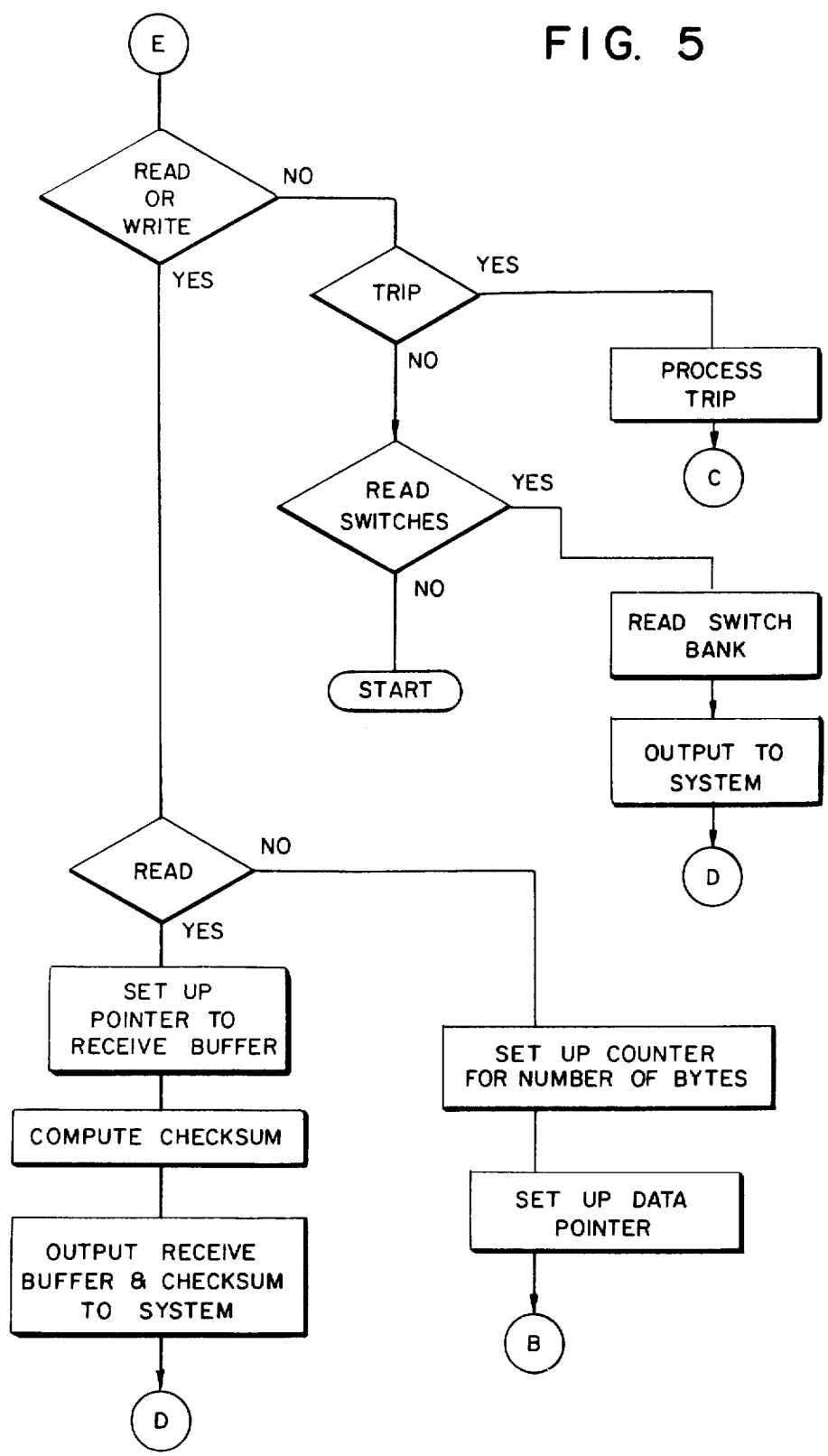
FIG. 5 is a flow chart illustrating a final portion of the basic routine for interface operation.

Referring now to FIGS. 3, 4 and 5 wherein the basic routine for controller operation is depicted, upon start-up the controller first initializes and then awaits receipt of a byte from the system processor.

Once a byte is received, an inquiry is made as to whether or not the byte is a command signal. Assuming that an initial command is to write data into the controller buffer for later transmission to a peripheral device, the program then inquires as to whether or not the previous command has been completed. Thereafter, a determination is made as to whether or not the command is a transmit or receive command. Since the write command is not a transmit or receive command, the routine branches to section E indicated in FIG. 5 and a determination is made as to whether or not it is a read or write command. A further determination is the made as to whether or not it is a read command. Following such determination, the program sets up a counter for the number of bytes of data to be received as indicated in the command byte and sets a data pointer.

Thereafter, the program re-enters the basic routine as indicated at B, awaiting the next byte from the system processor. Once the next byte is received, an inquiry is made as to whether or not the byte is a command. Since this byte is data, the routine branches and a further inquiry is made as to whether or not the previous command was "write". Since the previous command was write, the received data is stored in the transmit buffer and the byte is added to the check sum. Then an inquiry is made as to whether or not the total number of bytes set in the counter has been received. If more data is required, the program returns to await receipt of a subsequent byte from the system until the total number of bytes has been received. At such point, the checksum is examined and, if appropriate, the program branches to enter at D indicated in FIG. 4.

At this juncture, the command in progress is cleared, the checksum cleared and the program returns to a point B to await a subsequent byte from the system.

Assuming the next byte is a signal to transmit the stored data to a specific channel and then receive a signal from the peripheral device on that channel, upon receipt of such command byte the inquiries regarding whether a byte was received and whether the byte was a command are answered in the affirmative. Additionally, an inquiry is made as to whether the previous command was finished and a further inquiry is made as to whether or not the command is transmit or receive. Since this inquiry is answered in the affirmative, the program then selects the channel from the command byte and an inquiry is made as to whether or not the channel selected is the RS 232 channel.

Assuming that the channel is not the RS 232 channel, an inquiry is then made as to whether or not the command is "receive". Since the command is not receive, the program then transmits through the selected channel employing the Echoplex subroutine fully described in U.S. Pat. No. 4,301,507.

Thereafter, an inquiry is made as to whether or not the command was to receive after transmit. Since the answer to this inquiry is in the affirmative, the program then sets up a two second time out and enters into an Echoplex receive routine. Thereafter, a further inquiry is made as to whether or not the receive was successful. If the receive was unsuccessful, a further inquiry is made as to whether or not the two second time out period was lapsed. If such time period has not lapsed, the program then reenters at the receive Echoplex subroutine.

This subroutine is typically entered when setting the postage meters 26, 28. The meters are programmed to set to a given value on command, read the values to which they have been set in response to another command and transmit such values upon receipt of the other command signal.

In the event the reception was successful, the program outputs the transmit-receive status to the system, clears the command in progress, clears its checksum and re-enters at B, awaiting a byte from the system processor.

It should be understood that if the second command was to transmit only, after the Echoplex transmission, (in lieu of transmit and receive) the program would output the transmit-receive status, clear the command in progress and clear the checksum.

Assume the system processor transmits a read command after a prior receive command which resulted in the loading of peripherally generated data into a receive buffer, the program eventually enters subroutine branch E in FIG. 5, sets up a pointer to the receive buffer, computes the checksum and outputs the receive buffer data and checksum to the system.

A further command signal generated by the system processor 16 is a mailing machine trip signal for a specific postage meter. Upon receipt of a trip command signal, the program eventually branches into subroutine E of FIG. 5 and processes a trip of a specific meter. The postage meter is programmed to transmit a trip completed signal within two seconds of being tripped by the mailing machine. In processing the trip, the program sets up a two second time out period and enters an Echoplex receive routine on the postage meter channel. After the trip complete has been acknowledged, the status is output to the system processor and the command in progress is cleared.

In the event a command is transmitted for the controller 42 to read the switch bank 78, the program eventually enters the subroutine E, an inquiry is made as to whether or not the command was to read the switches, the switches are read and the values are transmitted to the system processor. The system processor 16 receives the switch reading and selects an appropriate data format for the peripheral device designated by such reading.

A further command which directs the program to the subroutine branch E is an initialize command which returns the program to the START after inquiring whether or not the command was to read switches.

It should be understood that, as employed herein, the terms mail and postage relate not only to governmental postal services and charges for such services but also to nongovernmental transport services including common carriers and private carriers and the transportation charges imposed by such entities.

Further, the term "data" should be considered as including more than numeric data but, in addition, any information exchanged between the peripheral devices and the system processor including commands such as set and trip as well as status indicators.

As various changes might be made in the interface and mailing system as set forth herein, it is to be understood that all matter herein described or shown in the accompanying drawings is to be interpreted as illustrative and not in a limiting sense.

Having thus described the invention, there is claimed as new and desired to be secured by Letters Patent:

1. In a mailing system including a stand alone postage scale comprising a mailing system processing means operatively connected to a scale means for determining the weight of an item to be mailed; an interface between the mailing system processing means and a plurality of mailing system peripheral devices, the interface comprising a controller and multiplexing means, the mailing system processing means including means for transmitting signals to the controller, the interface further including means operatively interconnecting the controller and the multiplexing means, means operatively interconnecting the multiplexing means and a selected peripheral device, the controller further including means for storing a communications subroutine, buffer means for storing data for subsequent transmission to the selected peripheral device, the controller receiving a first command signal from the processing means and in response thereto entering data received from the processing means into the buffer means, the controller receiving a second command signal and in response thereto transmitting a select signal indicative of the selected peripheral device to the multiplexing means and transmitting the data entered in the buffer means to the multiplexing means, the multiplexing means receiving the select signal and the data and in response thereto transmitting the data to the selected peripheral device, the controller transmitting the data entered in the buffer means in accordance with the stored communications subroutine, and the interface further comprising a self-contained circuit board which may be selectively interconnected to or disconnected from the processing means.

2. An interface in accordance with claim 1 wherein the controller comprises a microcomputer.

3. An interface between a mailing system processing means and a plurality of mailing system peripheral devices, the interface comprising a controller and multiplexing means, the mailing system processing means including means for transmitting signals to the controller, the interface further including means operatively interconnecting the controller and the multiplexing means, means operatively interconnecting the multiplexing means and a selected peripheral device, the controller further including means for storing a communications subroutine, buffer means for storing data for subsequent transmission to the selected peripheral device, the controller receiving a first command signal from the processing means and in response thereto entering data received from the processing means into the buffer means, the controller receiving a second command signal and in response thereto transmitting a select signal indicative of the selected peripheral device to the multiplexing means and transmitting the data entered in the buffer means to the multiplexing means, the multiplexing means receiving the select signal and the data and in response thereto transmitting the data to the selected peripheral device, the controller transmitting the data entered in the buffer means in accordance with the stored communications subroutine and the interface further including second buffer means for storing data for transmission to the mailing system processing means, the controller receiving a third command signal from the processing means and in response thereto entering data received from a selected peripheral device into the second buffer means, the system processor transmitting a fourth command signal to the controller, the controller receiving the fourth command signal and in response thereto transmitting the data stored in the second buffer means to the system processor, and wherein the data transmitted from the selected peripheral device is transmitted along further means interconnecting the selected peripheral device and the controller, the further interconnecting means including second multiplexing means.

4. In a mailing system including a scale means for determining the weight of an item to be mailed, means for operatively interconnecting the scale means and a mailing system processing means, and further including a plurality of mailing system peripheral devices, one of the peripheral devices comprising a postage meter; an interface between the mailing system processing means and the plurality of mailing system peripheral devices, the interface comprising a controller and multiplexing means, the mailing system processing means including means for transmitting signals to the controller, the interface further including means operatively interconnecting the controller and the multiplexing means, means operatively interconnecting the multiplexing means and a selected peripheral device, the controller further including means for storing a communications subroutine, buffer means for storing data for subsequent transmission to the selected peripheral device, the controller receiving a first command signal from the processing means and in response thereto entering data received from the processing means into the buffer means, the controller receiving a second command signal and in response thereto transmitting a select signal indicative of the selected peripheral device to the multiplexing means and transmitting the data entered in the buffer means to the multiplexing means, the multiplexing means receiving the select signal and the data and in response thereto transmitting the data to the selected peripheral device, the controller transmitting the data entered in the buffer means in accordance with the stored communications subroutine and the interface further including second buffer means for storing data for transmission to the mailing system processing means, the controller receiving a third command signal from the processing means and in response thereto entering data received from a selected peripheral device into the second buffer means, the system processor transmitting a fourth command signal to the controller, the controller receiving the fourth command signal and in response thereto transmitting the data stored in the second buffer means to the system processor.

5. An interface in accordance with claim 4 wherein the peripheral devices comprise a pair of postage meters, one postage meter including means for dispensing postage denominations for mail service and the other postage meter including means for dispensing transportation fees charged by other than mail service carriers.

6. A mailing system comprising a postage scale, the scale further comprising a system processor for determining postage to be applied to an article, a plurality of peripheral devices and a self-contained unitary interface connected between the peripheral devices and the system processor, the interface including a controller and the system processor, the controller comprising a processing unit, memory means for storing a plurality of communications subroutines, memory means for storing data for transmission to the peripheral devices and memory means for storing data received from the peripheral devices, the interface further comprising means operatively interconnecting the controller and the peripheral devices, the interconnecting means including multiplexing means, whereby servicing of mailing system malfunctions attributable to the interface is simplified.

7. A mailing system constructed in accordance with claim 6 wherein the means interconnecting the controller and the peripheral devices includes multiplexing means for transmission of data from the controller to the peripheral devices and further multiplexing means for transmission of data from the peripheral devices to the controller.

8. A mailing system constructed in accordance with claim 6 wherein the peripheral devices include a postage meter.

* * * * *